June 20, 1950      H. E. ALTGELT      2,511,894
SIDE-DELIVERY RAKE
Filed July 8, 1944      4 Sheets-Sheet 2
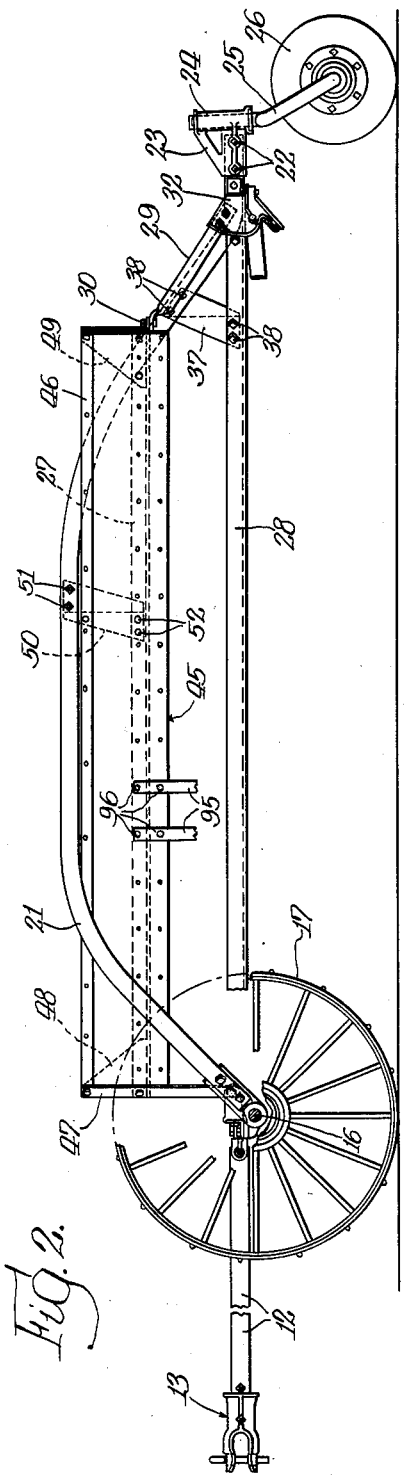
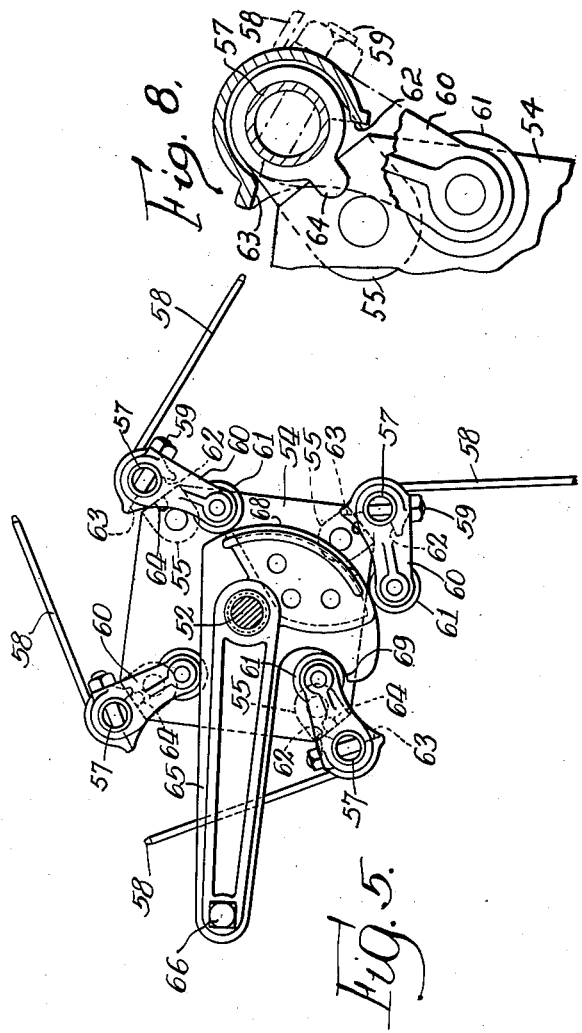
INVENTOR.
Herman E. Altgelt,
BY John P. Smith
Atty.

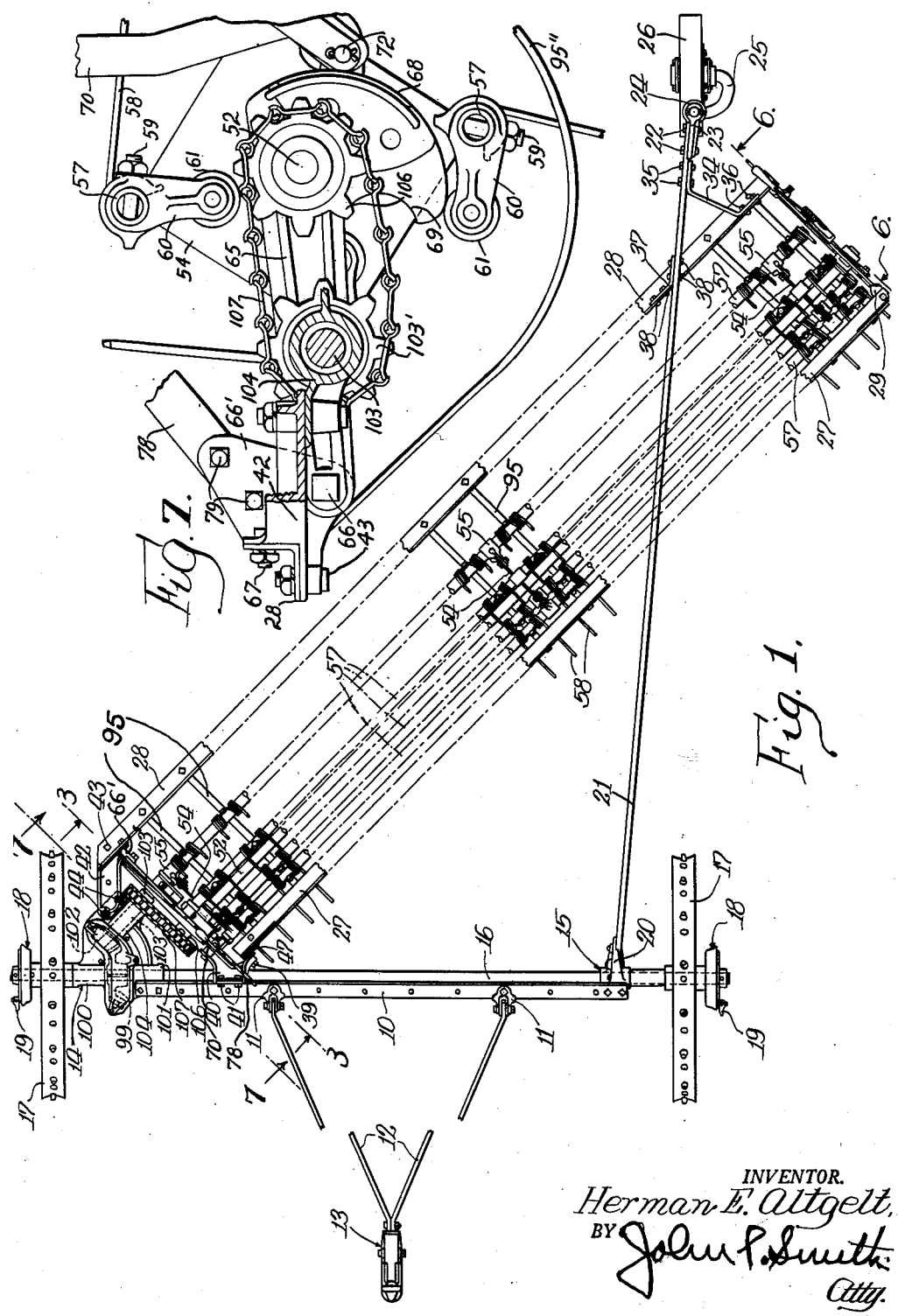

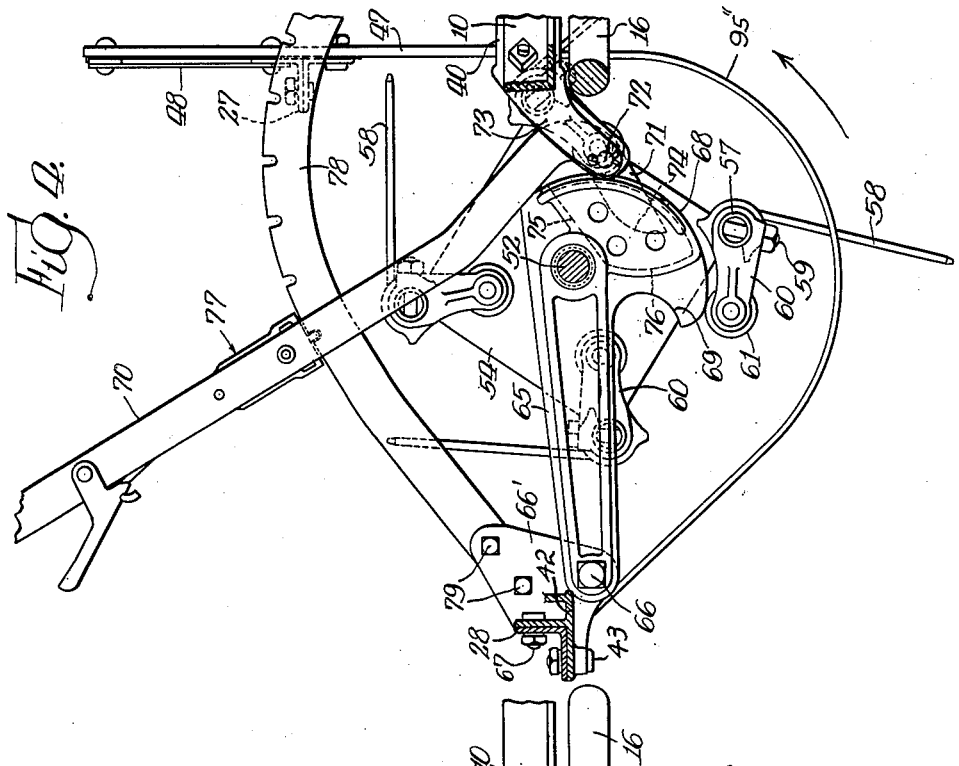
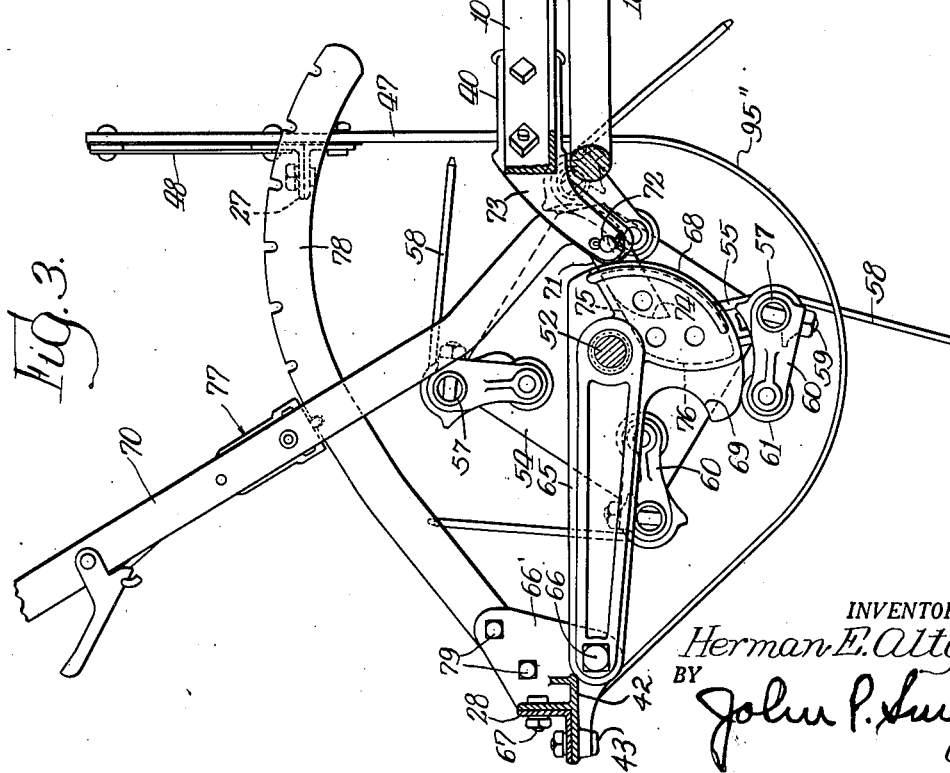

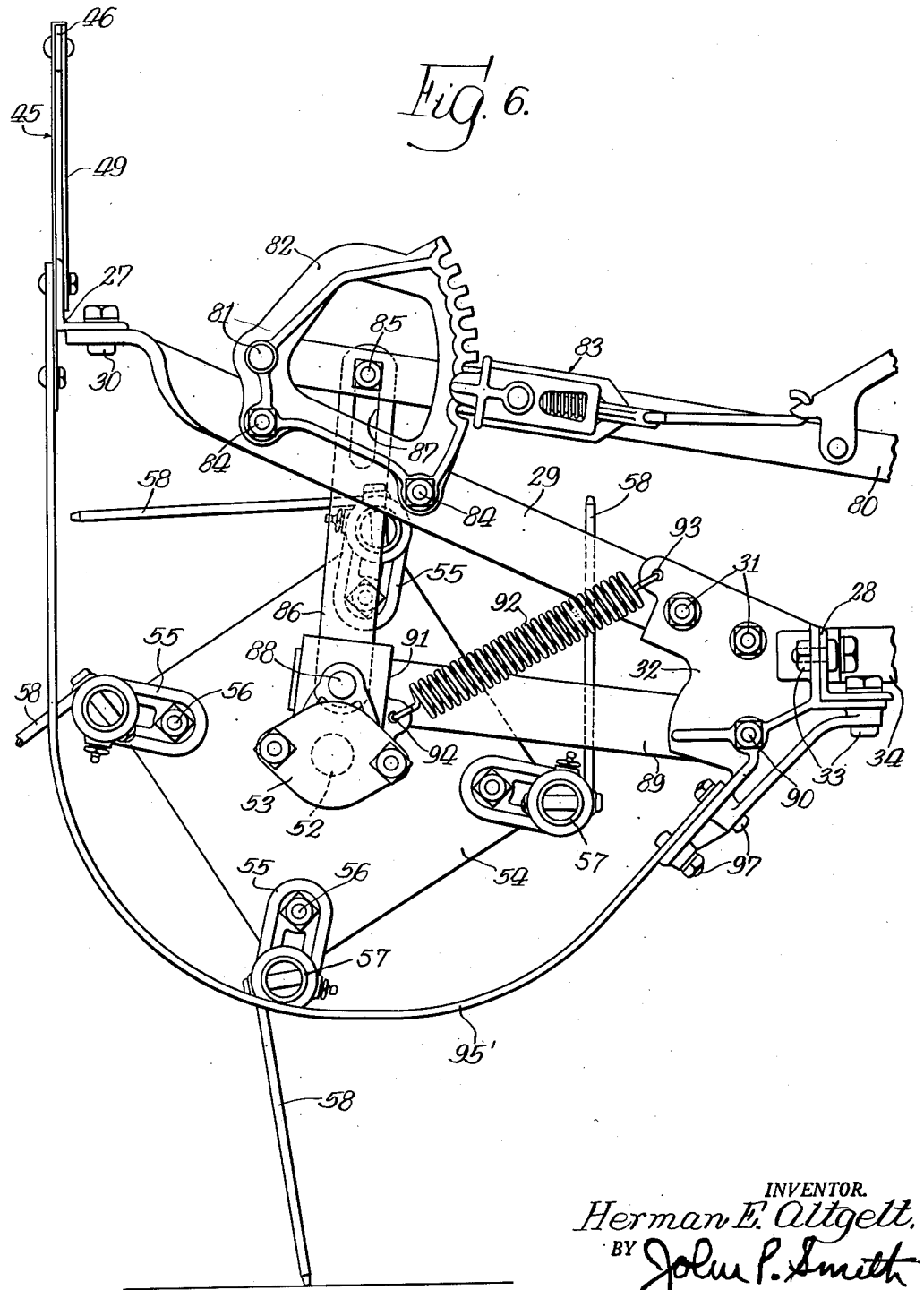

Patented June 20, 1950

2,511,894

UNITED STATES PATENT OFFICE 2,511,894

SIDE-DELIVERY RAKE

Herman E. Altgelt, South Bend, Ind., assignor to The Oliver Corporation, a corporation of Delaware Application July 8, 1944, Serial No. 544,043

10 Claims. (Cl. 56—377)

The present invention relates generally to rakes, but more particularly to a novel, compact and efficiently operated type of side delivery rake which is supported on and operatively driven by relatively small wheels and is relatively shorter in overall length by several feet than the conventional rake so that it can be more easily maneuvered and turned around at the ends of the field.

A further object of the invention is to provide a novel and improved type of side delivery rake which is not only considerably lighter in weight and lighter in draft than the conventional rake, but is also constructed of fewer and simpler parts with the over-all diameter of the reel reduced in size without sacrificing strength or the width of the rake in comparison with that of the conventional rake.

A still further object of the invention is to provide a novel and improved construction of side delivery rake in which less power or traction is required to drive the revolving reel and associated tine shafts of the reel, since the tine shafts are positively actuated or driven only through approximately one-fourth of their cycle of operation, while during the remaining three-quarters of the cycle of operation, the tine shafts remain idle or not being positively actuated in their respective bearings.

Another object of the invention is to provide a novel and improved side delivery rake in which the reel thereof is floatingly supported in the frame structure of the rake, so that the same may yield upwardly or float with respect to the main frame when an obstruction or ridge is encountered during its operation.

A yet further object of the invention is to provide a novel and improved construction of side delivery rake in which the spring tines of the reel are normally inclined rearwardly and downwardly with respect to the ground at the time of their first engagement with the ground and gradually assume a downwardly and forwardly direction in their travel of engaging and discharging the hay laterally. The position of the tines assume when first engaging the ground permits them to yield rearwardly when an obstruction such as a stone is encountered without breaking the tine.

These and other objects are accomplished by providing a construction and an arrangement of the various parts in the manner hereinafter described and particularly pointed out in the appended claims.

Referring to the drawings:

Fig. 1 is a top plan broken view showing the construction of my improved side delivery rake;

Fig. 2 is a side elevational view with the reel and other parts omitted;

Fig. 3 is an enlarged cross sectional view taken on the line 3—3 in Fig. 1;

Fig. 4 is an enlarged identical cross sectional view as shown in Fig. 3 showing the manner in which the forward end of the reel may float upwardly with respect to the main frame when the tines strike an obstruction in the ground;

Fig. 5 is an enlarged end elevational view partly in section of the reel with certain parts eliminated showing the manner in which the reel tines are actuated by the cam;

Fig. 6 is an enlarged cross sectional view taken on the line 6—6 in Fig. 1;

Fig. 7 is an enlarged cross sectional view taken on the lines 7—7 in Fig. 1 of the drawings; and Fig. 8 is an enlarged sectional and partly broken away view showing the stops for limiting the swinging movement of the tines of the reel.

For the purpose of illustration, I have shown my improved side delivery rake as comprising a transverse main frame member or angle 10. Secured to the main frame member 10 are draft brackets 11. Pivotally connected to each of the draft brackets 11 are forwardly converging draft members 12. The forward ends of the draft members 12 are provided with a draft clevis or connection, generally indicated by the reference character 13, for connecting the hay rake with the draft bar of a tractor. Journaled in suitable bearings, generally indicated by the reference characters 14 and 15, which in turn are secured to the opposite ends of the transverse frame member 10, is a main axle or shaft 16. Journaled adjacent the outer ends of the shaft 16 outside the respective bearings 14 and 15 are traction or drive wheels 17. Mounted on the outer ends of the shaft 16 outside each of the wheels 17 are the conventional type of clutches generally indicated by the reference character 18. These clutches are controlled by clutch levers 19 for clutching the wheels to the axle in the manner well understood in the art. Rigidly secured to the socket arm 20 formed integrally with the bearing 15 is a rearwardly and longitudinally extending arched main frame 21. The rearward end of the arched member extends horizontally and is secured by means of bolts 22 to a caster wheel bracket 23. Journaled in a vertical sleeve 24 of the caster wheel bracket 23 is a caster wheel axle 25. Journaled on a right angularly bent portion of the axle 25 is a caster wheel 26.

The construction thus far described constitutes in effect the main frame of my improved side delivery rake and in this connection it will be observed that the main traction wheels 17 are relatively of smaller diameter than the wheels heretofore employed in the conventional side delivery rake and therefore, reduces the cost in this respect.

The reel frame which forms part of the main frame and supports my improved type of reel thereon will next be described. This frame comprises spaced apart and diagonally extending frame or angle members 27 and 28. The rear ends of these members are connected together by a cross brace 29 which has one of its ends bolted as shown at 30 to the member 27 and its other end secured by means of bolts 31 to a bracket 32, which in turn is bolted to the frame member 28 by bolts 33. (See Fig. 6 of the drawings.) The rear end of the member 28 is supported by and connected to the rear end of an arch member 21 by a bracket 34 which has opposite ends secured to the respective members 28 and 21 by bolts 36 and 35 respectively. The member 28 is further braced to the arch member 21 by a plate or angle bracket 37 which is secured to these respective members by bolts 38. The forward end of the frame member 27 is secured by means of a bolt 39 to a bracket 40 which in turn is secured to the transverse main frame member 10 by means of bolts 41. The forward end of the frame member 28 is secured to a bracket 42 by means of bolts 43 and 67. The bracket 42 in turn is secured to the main bearing bracket 14 by means of bolts 44. Positioned on the forward side of the reel frame and extending above the member 27 is a sheet metal shield generally indicated by the reference character 45. The shield member 45 is bolted at spaced intervals throughout its length to the angle member 27 and its upper end is reinforced by a bar 46. The forward end of the shield 45 and bar 46 are supported on an upwardly extending vertical post or angle member 47 which has its lower end bolted to the bracket 40. The shield 45 is reinforced and braced to the post 47 by a triangular corner brace plate 48. The rear end of the shield is similarly reinforced and braced to the angle member 27 by a triangular corner brace plate 49. An intermediate portion of the reel frame member 27 is supported to the arched main frame member 21 by an angle plate 50 which has its upper end secured to the member 21 by bolts 51 and its lower end secured to the angle member 27 by bolts 52. (See Fig. 2 of the drawings.)

My improved reel contruction is provided with the conventional type of spring tines, but the over-all or outside diameter of the reel is reduced considerably over the conventional side delivery rake reel. This is accomplished by not requiring the tines to revolve inwardly past the reel shaft during each cycle of operation of the reel. In the present invention, the tines occupy a position substantially tangent to the circle described by the tine bar during the time they are passing through the non-working or idling arc of operation. This arrangement obviously reduces the over-all diameter of the reel and therefore makes the rake more compact so that the height of the whole frame structure is reduced a substantial amount over the height of the conventional rake. This arrangement also reduces to a minimum the draft required to drive the reel. This improved reel construction comprises a main reel shaft 52. The rear end of the shaft 52 is supported in a manner hereinafter described. Rigidly secured to the opposite ends and to the center of the reel shaft 52 are substantially square plates 54. Secured to the four corners of each of these plates are tine bar or pipe bearings 55 by means of bolts 56. Journaled in each of these aligned bearings carried by the plates 54 are tine pipes or bars 57. Secured at uniform intervals throughout the length of each of these tine bars 57 are springs or tines 58. Secured to the forward ends of each of the tine bars 57 by means of bolts 59 are cranks or roller arms 60. Journaled on the outer or free ends of each of the arms 60 are rollers 61. Positioned on one side of each of the arms 60 and arcuately spaced with respect to each other are stops 62 and 63. (See Fig. 5 of the drawings.) The stops 62 and 63 of each of these roller arms 60 are located in the path of and are adapted to engage a lug 64 formed integrally with each of the bearing brackets 55 and protruding through recesses in the foremost plate 54. These stops 62 and 63 limit the swinging movement of the roller arms 60 and the tine shafts 57 to which they are connected so that these shafts 57 may have an angular movement of substantially ninety degrees in controlling the positions of the tines during the cycle of operation of the reel. The forward end of the reel shaft 52 is journaled in a bearing arm 65 which in turn has one end pivoted on the shoulder bolt 66 secured to a vertically and inwardly projecting ear 66', formed integrally with the bracket 42. (See Fig. 3 of the drawings.) The bracket 42 as previously described is bolted to the reel frame or angle member 28 by bolts 43 and 67. Formed integrally with the free end of the arm 65 and arranged eccentrically with respect to the axis of the shaft 52 is a cam 68. The lower and rear portion of this cam begins with a hook-like portion 69, which lies in the path of and is adapted to be engaged successively by each of the rollers 61 carried by the respective arms 60 during the cycle of operation of the revolving reel. (See Figs. 3 and 5 of the drawings.)

From the above description it will be readily seen that as the tine shafts, together with their spring fingers or tines are travelling about the upper and rear arc of their cycle of operation, the stop 62 is adapted to engage the lug 64 on each of the bearing members 55 and as they approach the beginning of the lower arc of their cycle of operation, the rollers 61 will successively engage the hook portion 69 of the cam 68 and thereby actuate the tine bar and tines into position to sweep the hay laterally with respect to the reel frame, as clearly shown in Fig. 5 of the drawings. As the tines move forwardly and upwardly, the fingers become tangent to a gradually increasing circle concentric with the axis of the shaft 55.

The front end of the reel is floatingly supported in position so that it may yield to unevenness in the ground and may also be adjusted with respect to the main frame of the rake so that the tines may be adjusted with respect to the ground. This latter adjustment is controlled by a lever 70. The lower end of the lever 70 has substantially right angularly bent portion as shown at 71 and is pivoted as shown at 72 to a downwardly projecting arm 73 formed integrally with the bracket 40. The lowermost end of the lever has a downwardly curved and pointed end as shown at 74 which is adapted to engage a beveled or inclined edge 75 formed by a rectangular recess or pocket 76 on the free end of the arm 65 adjacent one side of the cam 68. The upper edge of the free end of the lever and the curved portion 74 thereof forms a rest or a support for the floating or free end of the arm 65 and permits this arm to rise in the event the front end of the reel strikes a ridge or other obstruction in the ground, yet at the same time the front end of the reel may be adjusted with respect to the ground by manipulating the lever 70 about its pivot 72. The lever 70 is locked in various positions of adjustment by the usual detent mechanism, generally indicated by the reference character 77 which is adapted to engage a sector mechanism in the form of a notched curved bar 78. The bar 78 has its lower rear end secured to the vertical ear 66' by means of bolts 79. (See Figs. 3, 4 and 7 of the drawings.) By referring to Figs. 3 and 4 of the drawings, it will be noted that the bearing arm 65 is resting on and being supported by the lower or free end of the lever 70, but should the reel strike an obstruction such as a ridge in the ground, the arm 65 may swing upwardly about its pivot 66 from the position shown in Fig. 3 to the position shown in Fig. 4 of the drawings and upon passing the ridge in the ground, will again return or assume the position shown in Fig. 3 of the drawings.

The rear end of the reel is adjustably and floatingly supported to the rear end of the main frame of the rake by a manually operable lever 80 which is pivotally connected as shown at 81 to a sector 82. The lever 80 is provided with the usual detent and locking mechanism generally indicated by the reference character 83 for locking the lever in various positions of adjustment. The sector 82 is secured by means of bolts 84 to cross frame member 29. Pivotally and slidably connected to a shoulder bolt 85 carried by the lever 80 is a link 86. The upper end of the link 86 is provided with a slot 87 which embraces and slidably connects the link 86 to the shoulder bolt 85. The lower end of the link 86 is pivotally connected as shown at 88 to the bearing bracket 53. The bearing bracket 53 is pivotally connected to the frame by means of a link 89 which has one end pivotally connected as shown at 90 to the bracket 32 and the other end thereof as shown at 91 secured to the bearing 53. A portion of the weight of the rear end of the reel is sustained by a balance spring 92 which has one end thereof connected to an apertured ear 93 formed on the casting or bracket 32 and its other end thereof connected to an apertured ear 94 formed on the bearing bracket 53.

From the above description it will be readily seen that by actuating the lever 80 upwardly the rear end of the reel may be raised with respect to the ground and at the same time it will be noted that should the rear end of the reel or any intermediate portion thereof strike an obstruction, the slotted link 86 will permit the reel to yield upwardly and such action will be assisted by the balancing spring 92 to swing the bearing 52 about the pivot 90 of the link 89 so that in the event of any unevenness in the ground, the whole reel may float or either end may float upwardly until such obstruction is passed and will then again assume its normal position.

Located throughout the length of the reel frame are uniformly spaced apart curved stripper bars 95 which have their upper and forward ends secured by means of bolt 96 to the shield 45 and angle member 27. These stripper bars extend vertically downward and extend in the center between each adjacent pair of fingers of the spring tines 58 and are arcuately curved concentric with respect to the axis of the reel. The rear end of the stripper bars are secured to the angle frame member 28. The rearmost stripper bar 95' is similarly curved, but has its rear end secured by means of bolts 97 to the bracket 32. (See Fig. 6 of the drawings.) The foremost stripper bar 95" has its forward end secured to the bracket 40 and its rearward end secured to the angle frame member 28. (See Fig. 3 of the drawings.)

The revolving reel is driven from the main axle 16 by means of a beveled gear 99 which is rigidly secured to the axle and located between spaced apart bearing portion 100 and 101 of bearing bracket 14. This beveled gear 99 meshes with and operatively drives the beveled pinion 102 which is secured to the forward end of a stub shaft 103. The stub shaft 103 is journaled in the bearing 104 formed integrally with the bearing bracket 101. Secured to the rear end of the stub shaft 103 is a sprocket wheel 103'. The sprocket wheel 103' is geared to and operatively drives a second sprocket wheel 106 by means of a chain 107. The sprocket wheel 106 is rigidly secured to the forward end of the reel shaft 52.

Summarizing the functions of operation and advantages of my improved side delivery rake, it will be observed that the present rake is of the same standard width as the conventional one, but is shorter in over-all length or dimension which makes it more convenient in turning around at the ends of a field and is therefore more easily turned or maneuverable. The present rake construction has fewer and simpler parts and the tine bars of the rake reel are positively driven only through a small arc of their cycle of operation requiring less power to drive the reel, with the result of less draft to draw and actuate the rake reel. It will also be observed, that due to the fact that the tines and the tine bars are power actuated in their respective bearings, only through a portion or approximately ninety degrees of their cycle of operation, while during the remainder or greater part of their revolving action, are free or idle. This feature, together with the fact that the tines are not required to revolve inwardly past the reel shaft as is required with the conventional rake, results in a rake reel of smaller diameter and a rake frame of reduced height. At the same time it will be noted that the spring tines are of the conventional length so that the capacity thereof is as great or greater than the rakes now on the market. This arrangement also reduces the over-all length and height of the rake frame and eliminates the use of large traction wheels. It will also be observed that the rake reel is floatingly supported on the rake frame so that when the reel strikes an obstruction or ridge in the ground, it may yield with respect to the frame and resume its normal adjusted position after passing the obstruction. The small diameter of the rake reel also permits the positioning of the axis in a position closer to the ground than the conventional rake reel, and by reason of this fact, together with the light draft of the rake permits the employment of relatively smaller wheels than is used with the conventional rake.

It will be observed that the balancing spring 92 offsets some of the weight of the revolving reel at the rear end of the rake and part of the weight of the front end of the reel is counterbalanced by the action of the drive chain in relation to the pivoted lever 65. In this connection it will be noted that the lever 65, which supports the reel shaft 52, is actuated upwardly about its pivot

66 because the upper portion of the drive sprocket wheel 103' exerts the pulling force on the upper lap of the chain in a direction to the lever as viewed in Fig. 7 of the drawings. This pulling force on the chain is transmitted to actuate the drive sprocket wheel 106 and at the same time tends to lift the free end of the lever 65 upwardly to thereby serve as a balancing force on the reel.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A side delivery rake comprising a main frame, wheels for supporting said frame, a vertically adjustable reel mounted on said frame including a reel shaft, means for driving said reel by certain of said wheels, a plurality of tine bars oscillatably supported on said reel shaft, a plurality of spaced apart tines secured to said bars, means for limiting the oscillatory movement of said tine bars, a member pivoted to said main frame, a bearing in said member for rotatably supporting one end of said reel shaft, a cam carried by said member and operatively related to said bars for actuating said bars during a certain arc of the cycle of operation of said reel, and means for adjusting said member for varying the position of said reel with respect to the ground.

2. A side delivery rake comprising a main frame, wheels for supporting said frame, a vertically adjustable reel mounted on said frame including a reel shaft, means for driving said reel by certain of said wheels, a plurality of tine bars oscillatably supported on said reel shaft, a plurality of spaced apart tines secured to said bars, means for limiting the oscillatory movement of said tine bars, inwardly projecting arms having their outer ends pivoted to said frame, said reel being journaled adjacent the inner ends of said arms, a cam formed integrally with one of said arms and operatively related to said bars for actuating said bars, and means mounted on said main frame and engageable with one of said arms for adjustably and floatingly supporting one end of said reel.

3. A side delivery rake comprising a main frame, wheels for supporting said frame, a vertically adjustable reel mounted on said frame including a reel shaft, means for driving said reel by certain of said wheels, a plurality of tine bars oscillatably supported on said reel shaft, a plurality of spaced apart tines secured to said bars, means for limiting the oscillatory movement of said tine bars, an arm pivotally mounted on said frame, a bearing formed on one end of said arm in which said reel shaft is journaled, a cam formed on said arm and operatively related to said bars for actuating said tines, and a hand operating lever pivoted on said main frame and operatively related to said arm for adjustably and floatingly supporting one end of said reel.

4. A side delivery rake comprising a main frame, wheels for supporting said frame, a vertically adjustable reel mounted on said frame including a reel shaft, means for driving said reel by certain of said wheels, a plurality of tine bars oscillatably supported on said reel shaft, a plurality of spaced apart tines secured to said bars, means for limiting the oscillatory movement of said tine bars, an arm pivotally mounted on said frame, a bearing carried by said arm in which one end of said reel shaft is journaled, a cam formed integrally with said arm, crank arms secured to said bars and adapted to move into the path of said cam for actuating said bars, and a lever pivoted to said frame and engageable with said first named arm for adjustably and floatingly supporting one end of said reel.

5. A side delivery rake comprising a main frame, wheels for supporting said frame, a vertically adjustable reel mounted on said frame, including a reel shaft, means for driving said reel by certain of said wheels, a plurality of tine bars oscillatably supported on said reel shaft, a plurality of spaced apart tines secured to said bars, means for limiting the oscillatory movement of said tine bars, an arm pivotally mounted on said frame, a bearing carried by said arm in which one end of said reel shaft is journaled, a cam formed integrally with said arm, crank arms secured to said bars and adapted to move into the path of said cam for actuating said bars, and a hand operated lever pivoted intermediate its ends to said frame and having its lower end engageable with a recess formed in said first named arm for adjustably and floatingly supporting one end of said reel.

6. A side delivery rake comprising a frame, wheels for supporting said frame, a reel shaft journaled on said frame, horizontal spaced apart arms pivoted on said frame for supporting said shaft, a reel mounted on said shaft including a plurality of concentrically arranged and oscillatable tine bar, means for driving said reel in all floating positions from certain of said wheels, tines carried by said bars, means for limiting the oscillatory movement of said bars and cam means formed integrally with one of said arms for angularly actuating said bars during a certain arc of the cycle of operation of said reel.

7. A side delivery rake comprising a main frame, wheels for supporting said frame, a floating reel shaft journaled on said frame, a reel mounted on said shaft including a plurality of concentrically arranged and oscillatable tine bars, means for driving said floating reel shaft from said wheels, tines carried by said bars, a roller arm carried by each of said bars, lugs carried by said reel, spaced apart stops carried by said roller arms and engageable with said lugs for limiting the oscillatory movement of said bars, and adjustable means mounted on said frame and engageable with said roller arms for controlling the oscillation of said bars during a certain arc of the cycle of operation of said reel.

8. A side delivery rake comprising a main frame, wheels for supporting said main frame, a vertical and adjustable reel mounted on said frame including a reel shaft, means for driving said reel by certain of said wheels, a plurality of tine bars oscillatably supported on said reel shaft, a plurality of spaced apart tines secured to said bars, means for limiting the oscillatory movement of said tine bars, an arm having one end thereof pivoted to said frame, a cam on one end of said arm and operatively related to said bars for actuating said bars during a certain arc of the cycle of operation of said reel, and a lever operatively connected to said arm for adjusting one end of said reel with respect to the ground.

9. A side delivery rake comprising a main frame, wheels for supporting said main frame, a floating reel mounted on said main frame including a reel shaft, spaced apart plates secured to said shaft, tine bar bearing brackets secured to said plates, tine bars oscillatably mounted in said brackets, stop lugs formed on said brackets, a roller arm secured to one end of each of said tine bars, spaced apart stops formed on each of said roller arms and engageable with the lugs of the respective brackets for limiting the respective angular movement of each of said tine bars, arms pivotally connecting the reel shaft to said main frame, means formed integrally with one of said last named arms and engageable with said roller arms for actuating said tine bars, and drive means for operatively connecting certain of said wheels with said reel shaft, said drive means being positioned with respect to one of said pivoted arms whereby a balancing force is exerted on said reel.

10. A side delivery rake comprising a main frame, wheels for supporting said frame, a vertically adjustable reel mounted on said main frame, means including a chain for driving said reel by certain of said wheels, arms pivoted to said main frame for supporting said reel on the free ends thereof, said chain being positioned with respect to one of said arms so as to actuate said arm upwardly to balance some of the weight at one end of said reel, and a balancing spring carried by said main frame and operatively related to said reel for offsetting part of the weight at the other end of said reel.

HERMAN E. ALTGELT.

REFERENCES CITED

The following references are of record in the file of this patent:

UNITED STATES PATENTS

| Number | Name | Date |
|---|---|---|
| 471,648 | Mann | Mar. 29, 1892 |
| 946,883 | Smith | Jan. 18, 1910 |
| 1,914,036 | Moschel | June 13, 1933 |
| 2,162,506 | Jones et al. | June 13, 1939 |
| 2,255,288 | Jones et al. | Sept. 9, 1941 |
| 2,378,107 | Russell | June 12, 1945 |